United States Patent [19]

Muryoi

[11] 4,421,389
[45] Dec. 20, 1983

[54] MACRO ZOOM LENS BARREL

[75] Inventor: Takeshi Muryoi, Chigasaki, Japan

[73] Assignee: Nippon Kogaku K.K., Tokyo, Japan

[21] Appl. No.: 308,110

[22] Filed: Oct. 2, 1981

[30] Foreign Application Priority Data

Oct. 8, 1980 [JP] Japan .............................. 55-139931

[51] Int. Cl.$^3$ ................................................ G02B 7/10
[52] U.S. Cl. ...................................... 350/429; 350/430
[58] Field of Search .................................. 350/430, 429

[56] References Cited

U.S. PATENT DOCUMENTS

| | | | |
|---|---|---|---|
| 4,097,124 | 6/1978 | Watanabe et al. | 350/430 |
| 4,162,822 | 7/1979 | Nonogaki | 350/429 |
| 4,171,880 | 10/1979 | Mori et al. | 350/430 |

*Primary Examiner*—Jon W. Henry
*Attorney, Agent, or Firm*—Shapiro and Shapiro

[57] ABSTRACT

A zoom lens barrel having a single operating ring for effecting focusing by rotating operation of the operating ring about the optical axis with respect to a fixed portion and zooming by moving operation of the operating ring in the direction of the optical axis includes means provided between the operating ring and the fixed portion for limiting the operations by the operating ring. The limiting means impedes the focusing with respect to an object lying at a shorter distance than a predetermined distance when the operating ring is in a position corresponding to a short focal length with a predetermined focal length as the boundary and impedes the zooming to the short focal length when the operating ring is in a position corresponding to the focusing with respect to the object lying at the shorter distance.

4 Claims, 3 Drawing Figures

MACRO ZOOM LENS BARREL

BACKGROUND OF THE INVENTION

1. Field of the Invention

This invention relates to improvements in a zoom lens barrel provided with a single operating ring.

2. Description of the Prior Art

Most of the zoom lenses of wide angle standard lens systems are of the type in which the forwardmost group lens is moved for both zooming and focusing operations, but the lenses of this type have a disadvantage that the light beam is kicked at the short focal length side of the lens if photography up to a macro area is effected only by focusing. In a zoom lens barrel provided with operating rings exclusively used for zooming and focusing, respectively, a construction in which macro focusing can be effected only at the long focal length side to prevent the kick of the light beam at said short focal length side is disclosed in U.S. Pat. No. 4,210,387, but in a zoom lens provided with a single operating ring, change-over of the distance limit range has been difficult because the operating ring moves back and forth.

SUMMARY OF THE INVENTION

It is an object of the present invention to provide a zoom lens barrel provided with a single operating ring in which the allowed area of focusing is variable in response to a zooming operation.

It is another object of the present invention to provide a zoom lens barrel provided with a single operating ring in which the focusing up to a macro area is possible only when zooming has been effected to the long focal length side.

According to the present invention, there is provided a zoom lens barrel in which the relation between a first limiting member displaceable in response to movement of the operating ring and a second limiting member for preventing displacement of the first limiting member is such that when the first limiting member is in the area of the short focal length side, it is not displaceable to the macro area of the object distance and when the first limiting member is in the macro area, it is not displaceable to the long focal length side.

The invention will become more fully apparent from the following detailed description thereof taken in conjunction with the accompanying drawings.

DESCRIPTION OF THE PREFERRED EMBODIMENTS

Figure 1:
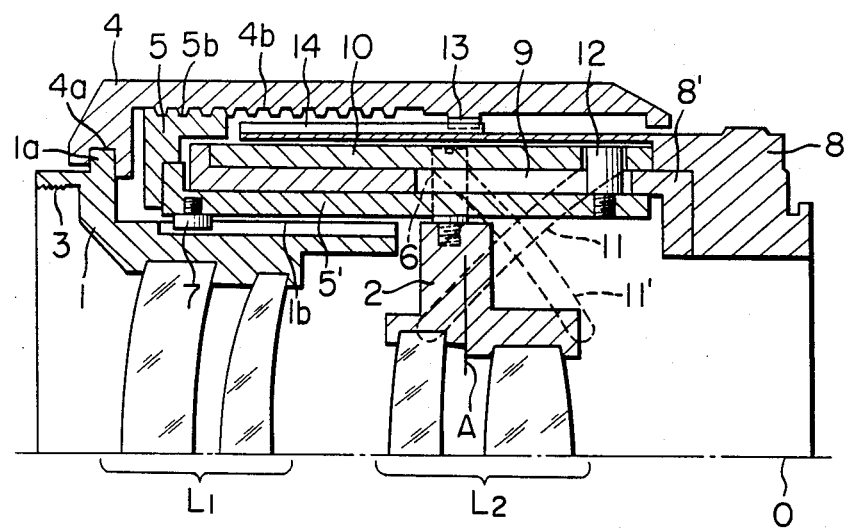
FIG. 1 is a cross-sectional view of an embodiment of the present invention.

Referring to FIG. 1, a forward group lens $L_1$ acting on both zooming and focusing is supported by a holding ring 1. A rearward group lens $L_2$ operating with the forward group lens $L_1$ during zooming is supported by a holding ring 2. A diaphragm blade A is carried by the holding ring 2.

The holding ring 1 is provided with a screw 3 for attaching accessories (polarizing filter, etc.) and also provided with a rotational mating portion 1a and a straight key groove 1b formed in the direction of the optical axis. The rotational mating portion 4a of an operating ring 4 supported on a fixed cylinder 8 for rotation about the optical axis 0 and for sliding movement in the direction of the optical axis rotatably mates with the rotational mating portion 1a. Helicoid threads 4b are formed on the inner periphery of the operating ring 4 and are theadedly engaged by the helicoid threads 5b of a first sliding ring 5. A second sliding ring 5' is made integral with the first sliding ring 5 and is provided with a pin 7 which is inserted in the key groove 1b. On the other hand, a fixed portion 8' integral with the fixed cylinder 8 is formed with a straight key groove 9 in the direction of the optical axis. Between the fixed cylinder 8 and the fixed portion 8', a cam cylinder 10 is supported for rotation about the optical axis. A cam pin 12 studded in the second sliding ring 5' is inserted into the cam slot 11 of the cam cylinder 10 through the key groove 9. A cam pin 6 studded in the holding ring 2 is inserted in a cam slot 11' formed in the cam cylinder 10, through another straight key groove (not shown) formed in the fixed portion 8' and extending in the direction of the optical axis. A distance limiting projection 13 is provided on the inner periphery of the operating ring 4. A limiting plate 14 capable of contacting the projection 13 is secured to the fixed cylinder 8.

Figure 2:
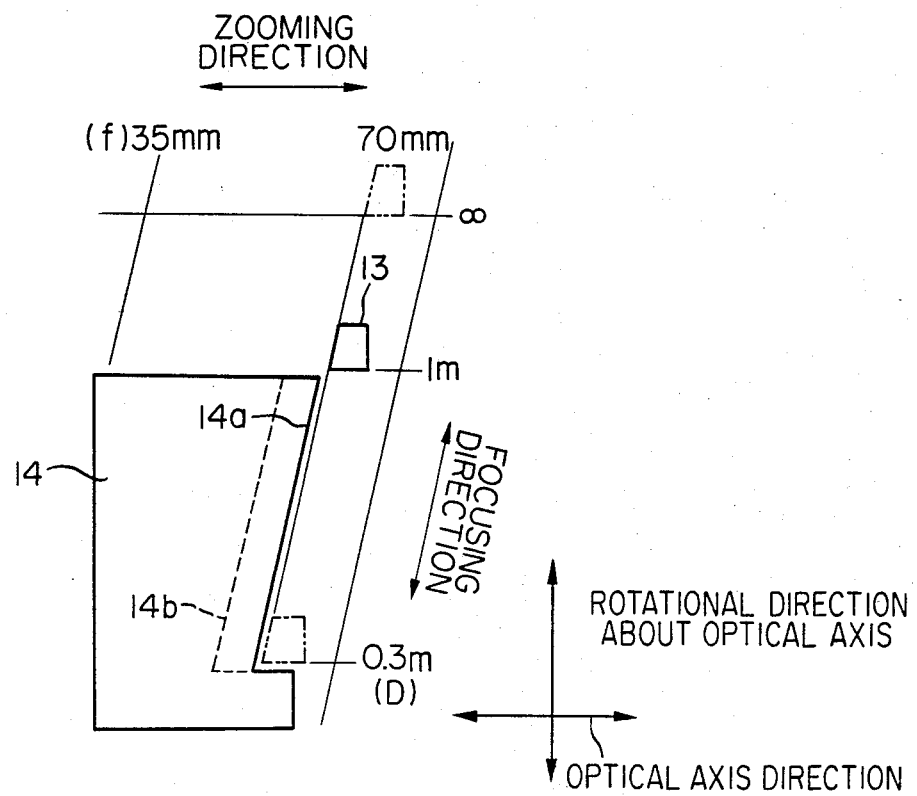
FIG. 2 illustrates the principle of the distance limiting portion of FIG. 1.

The distance limiting projection 13 and the limiting plate 14 are in a relation as shown in FIG. 2 with respect to the zooming by the movement of the operating ring 4 in the direction of the optical axis and the focusing by the rotation of the operating ring 4 about the optical axis. That is, (1) when the focal length f=70 mm, focusing is possible up to the object distance $D = \infty - 0.3$ m and once focusing is effected to $D = 1 - 0.3$ m, zooming becomes impossible, and (2) when focusing is effected to $D = \infty - 1$ m, zooming is possible in the range of the entire focal length $f = 70 - 35$ mm. This will hereinafter be described in detail.

Operation will now be described. First, when the operating ring 4 is rectilinearly moved in the direction of the optical axis, the sliding rings 5 and 5' are rectilinearly moved in the direction of the optical axis due to the engagement between the helicoid threads 4b and 5b, and also the holding ring 1 is rectilinearly moved in the direction of the optical axis due to the mating of the rotational mating portions 4a and 1a. At this time, the pin 12 extends through the key groove 9 and therefore, the sliding rings 5, 5' and the holding ring 1 are rectilinearly moved together. On the other hand, the cam pin 12 rotates the cam cylinder 10 in accordance with the shape of the cam slot 11. Since the cam slot 11' through which the cam pin 6 extends is also displaced by the cam cylinder 10, the cam pin 6 is rectilinearly moved in the direction of the optical axis in response thereto. Thus, the holding ring 2 is rectilinearly moved in the direction of the optical axis. Accordingly, the rectilinear movement of the operating ring 4 in the direction of the optical axis causes rectilinear movement of the forward group lens $L_1$ and the rearward group lens $L_2$ in the direction of the optical axis and relative positional change between the two, thereby enabling zooming to be accomplished.

Next, when zooming is terminated and an arbitrary focal length is set, the operating ring 4 is rotated about the optical axis. Thereupon, the sliding rings 5 and 5' are not rotated due to the mating between the cam pin 12 and the key groove 10 and therefore, the operating ring 4 is rectilinearly moved by an amount corresponding to the lead of the helicoid threads 4b in the direction of the optical axis while rotating. At this time, the holding ring 1 is rectilinerarly guided by the pin 7 and the key groove 1b and therefore, only the rectilinear movement of the operating ring 4 is transmitted from the rotational mating portion 4a to the rotational mating portion 1a. Therefore, the holding ring 1 moves the forward group lens $L_1$ rectilinearly in the direction of the optical axis. This is the focusing operation.

Now, the functions of the distance limiting projection 13 and the limiting plate 14 will be described in detail by referring to the above-described operation. Assuming that the operating ring 4 is set between D = ∞ − 1 m, the projection 13 and the plate 14 are in non-interfering condition with respect to the movement in the direction of the optical axis and therefore, the operating ring 4 can freely move rectilinearly in the direction of the optical axis with the projection 13. Thus, the focal length from f = 70 mm (when the operating ring 4 is in its position shown in FIG. 1) to f = 35 mm (when the operating ring 4 has been moved forwardly by a predetermined amount from its position shown in FIG. 1) can be freely selected.

On the other hand, when the focal length has been set to the side shorter than f = 70 mm by this operation, the projection 13 and the plate 14 assume interfering condition with respect to the direction of rotation about the optical axis at D = 1 m and therefore, rotation of the operating ring 4 is permitted only between D = ∞ − 1 m and the focusing up to a macro area (D = 1 − 0.3 m) is impeded by the engagement between the projection 13 and the plate 14.

To enable the focusing up to the macro area, the operating ring 4 may be moved in the direction of the optical axis to bring about f = 70 mm and the projection 13 and the plate 14 may be brought into non-interfering condition with respect to the rotation about the optical axis, whereafter the operating ring may be rotated. Thereupon, in accordance with the rotation of the operating ring, the projection 13 moves along the inclined surface 14a of the plate 14. The inclined surface 14a is provided to secure the non-interfering condition of the projection 13 and the palte 14 by providing an escape for the plate 14 by an amount corresponding to the rectilinear movement of the operating ring 4, namely, the projection 13, in the direction of the optical axis which is caused by rotation of the operating ring 4.

In this manner, the focusing in the macro area becomes possible and, at D = 1 ∼ 0.3 m, the projection 13 and the plate 14 assume interfering condition with respect to the direction of the optical axis and thus, zooming in the macro area is impeded.

Figure 3:
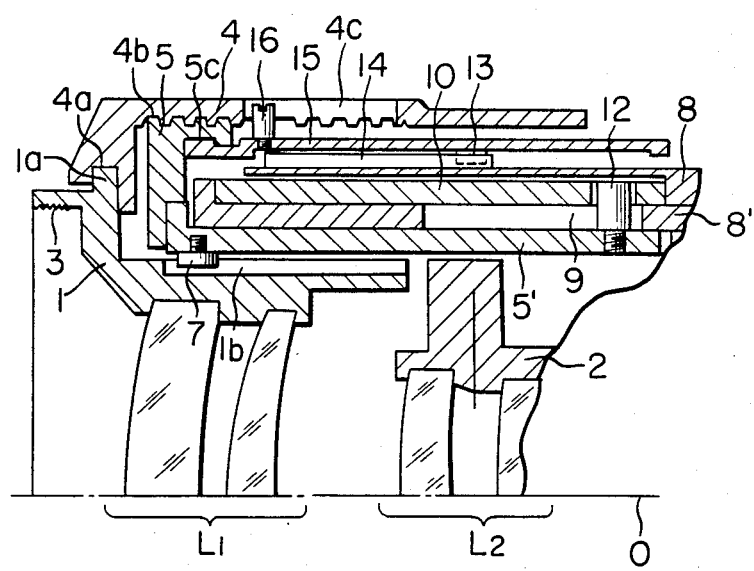
FIG. 3 is a cross-sectional view of another embodiment of the present invention.

FIG. 3 shows another embodiment of the present invention in which the movement of the distance limiting projection 13 in the direction of the optical axis during rotation of the operating ring 4 is eliminated. In FIG. 3, members functionally similar to those in FIG. 1 are given similar reference characters and need not be described.

A first sliding ring 5 is formed with a mating portion 5c. A distance scale ring 15 mates with the first sliding ring 5 at the mating portion 5c thereof for rotation and movement in the direction of the optical axis with the latter. The distance limiting projection 13 is secured to the ring 15. A pin 16 studded in the ring 15 is inserted in a straight key groove 4c formed in the operating ring.

Now, when the operating ring 4 is rectilinearly moved for zooming in the same manner as that previously described, the forward group holding ring 1, the sliding rings 5, 5′ and the distance scale ring 15 are rectilinearly moved in the direction of the optical axis. Also, when the operating ring 4 is rotated for focusing, the operating ring 4 is rectilinearly moved by an amount corresponding to the lead of the helicoid threads 4b. However, the sliding rings 5 and 5′ are not rotated and therefore, only the rotation of the distance scale ring 15 is transmitted by the key groove 4c and pin 16, and the rectilinear movement of the operating ring 4 is absorbed by the key groove 4c and is not transmitted to the ring 15. Accordingly, the projection 13 does not move rectilinearly in the direction of the optical axis during rotation of the operating ring 4 as in the embodiment shown in FIG. 1. This eliminates the necessity of providing an inclined surface 14a on the limiting plate 14.

According to the above-described embodiment, the forward group holding ring is not rotated during zooming and focusing and therefore, when a polarizing filter or the like is mounted on the accessory mounting screw 3, the characteristic of the light beam arriving at the finder system and the exposure system during focusing and zooming or thereafter is not varied. Accordingly, the degree of freedom with which accessories are used is increased.

In the above-described embodiments, the focal length which enables focusing up to the macro area is limited to 70 mm, whereas in a device wherein no kick occurs, for example, between the focal lengths of 50 − 70 mm from the viewpoint of lens performance, focusing up to the macro area in this range may be made possible and zooming in the macro area may also be made possible. For this purpose, for example, an inclined surface 14b as indicated by broken line may be provided instead of the inclined surface 14a indicated in FIG. 2.

I claim:

1. A zoom lens barrel having a single operating ring for effecting focusing by rotating operation of the operating ring about the optical axis with respect to a fixed portion and zooming by moving operation of the operating ring in the direction of the optical axis, said zoom lens barrel comprising:

means provided between said operating ring and said fixed portion for limiting said operations by said operating ring, said means impeding said focusing with respect to an object lying at a shorter distance than a predetermined distance when said operating ring is in a position corresponding to a short focal length with a predetermined focal length longer than said short focal length as the boundary and impeding the zooming to said short focal length when said operating ring is in a position corresponding to the focusing with respect to the object lying at said shorter distance.

2. A zoom lens barrel according to claim 1, wherein said limiting means includes:

(a) a first limiting member displaceable in response to movement of said operating ring; and (b) a second limiting member provided on said fixed portion for prescribing the area in which said first limiting member is displaceable.

3. A zoom lens barrel according to claim 1, further including a first lens group held by a first cylinder, a second lens group held by a second cylinder, and means for moving said first cylinder in the direction of the optical axis for said focusing in response to said operating ring and for moving said first and second cylinders in the direction of the optical axis for said zooming in response to said operating ring.

4. A zoom lens barrel according to claim 3, wherein said moving means includes a sliding member threadedly engaged with said operating ring and movable with said operating ring with respect to the movement of said operating ring in the direction of the optical axis and prevented from rotating about the optical axis, said first cylinder is provided integrally with said operating ring in the direction of the optical axis, and said limiting means includes a first limiting member coupled to said operating ring for sliding movement in the direction of the optical axis and coupled to said sliding member for rotation about the optical axis, and a second limiting member provided on said fixed portion for prescribing the area in which said first limiting member is displaceable.

* * * * *